US007814953B2

(12) United States Patent
Zacche' et al.

(10) Patent No.: US 7,814,953 B2
(45) Date of Patent: Oct. 19, 2010

(54) LABELLING MACHINE

(75) Inventors: Vanni Zacche', Roncoferraro (IT); Antonio Secchi, Campegine (IT)

(73) Assignee: Sidel Holdings & Technology S.A., Pully (CH)

( * ) Notice: Subject to any disclaimer, the term of this patent is extended or adjusted under 35 U.S.C. 154(b) by 648 days.

(21) Appl. No.: 11/758,300

(22) Filed: Jun. 5, 2007

(65) Prior Publication Data

US 2008/0083504 A1 Apr. 10, 2008

(30) Foreign Application Priority Data

Jun. 6, 2006 (EP) ................................. 06425384

(51) Int. Cl.
*B32B 41/00* (2006.01)

(52) U.S. Cl. ....................... 156/351; 156/352; 156/362; 156/367; 156/368; 156/378

(58) Field of Classification Search ................. 156/351, 156/352, 362, 367, 368, 378
See application file for complete search history.

(56) References Cited

U.S. PATENT DOCUMENTS 4,994,135 A 2/1991 Orlandi
5,478,422 A * 12/1995 Bright et al. .................. 156/64

FOREIGN PATENT DOCUMENTS

| | | |
|---|---|---|
| DE | 19927668 | 12/2000 |
| EP | 1122173 | 8/2001 |
| EP | 1174345 | 1/2002 |

* cited by examiner

*Primary Examiner*—George R Koch, III
(74) *Attorney, Agent, or Firm*—Shoemaker and Mattare

(57) ABSTRACT

A rotary labelling machine comprises a carrousel that can be pivotally driven by a carrousel motor and a plurality of container stations supported by said carrousel, wherein each container station comprises a container-holder plate and a plate motor suitable to rotate the plate about its own axis, carrousel sensor means detecting the movement of the carrousel and generating a reference signal representative of the carrousel angular position, a plurality of local control units. Each control unit is connected with one of the plate motors, respectively, and is configured to receive and process the reference signal and generate a control signal specific for said plate motor. Signal propagation means are connected to the carrousel sensor means and to the local control units to propagate the reference signal to each of the local control units.

21 Claims, 2 Drawing Sheets

LABELLING MACHINE

BACKGROUND OF THE INVENTION

1. Field of Invention

The present invention relates to a rotary labelling machine of the type comprising a carrousel supporting a plurality of bottle-holding plates along the periphery thereof, in which the carrousel can be pivotally driven by a carrousel motor in order to be able to place each individual plate of the carrousel at one or more labelling stations arranged about the carrousel, and in which each bottle-holding plate is associated with a drive motor suitable to rotate the plate about the axis thereof in order to be able to place the bottle, or generally the container being supported by the plate, in the angular positions required for applying the label.

2. Description of the Prior Art

In order to achieve a satisfactory labelling, for example of containers different from one another, containers having a non-cylindrical shape, and containers having, in addition to the label, further ornamental or technical accessories requiring the label to be placed in dependency from the position of the further accessory, labelling machines are provided with command and control means driving the drive motors of the plates, such that a preset movement and positioning is imposed to each plate as a function of the angular position of the carrousel in order to properly orientate the containers to be labelled when they are conveyed to the labelling stations.

Electric motors have been proposed for driving the bottle-holding plates, such as direct current, alternate current or three-phase motors. These motors can be of the synchronous, asynchronous or stepping types. These electric motors are connected to the bottle-holding plate, with or without a drive mechanism being interposed therebetween.

A known solution provides that said command and control means for the drive motors comprise a controller (usually a computer), which is connected by means of suitable control lines (usually electrical wires) on the one side with an angular position sensor of the carrousel, and on the other side, with drive motors or power stages, which are, in turn, connected to the drive motors. The controller is programmed to process signals received from the angular position sensor and to generate response signals that command the drive motors or the power stages of the drive motors in order to impose the desired movement to the plate.

Since each individual plate, and thus each individual drive motor of a carrousel that can indicatively contain fifteen to sixty plates follows a different movement profile from that of the other motors and requires its own control line, or in other words, its own channel of bidirectional communication with the controller, the number of electrical connections is very high, thus resulting in a complicated system difficult to be managed.

In order to reduce the amount of wiring, while maintaining the same data flow between the controller and the power stages of the motors, the use of a communication bus has been suggested, which is suitable to receive a signal flow from the controller and distribute it to each drive motor in a selective manner.

As all the required information (movement profile and positioning of each motor) and all the processing operations (e.g., the calculation of the angular position and/or angular speed and/or angular acceleration and/or relative electrical power quantities of the motor) reside in the controller, a high performance of the communication bus is required in order to sort and distribute, in a sequential manner, the control signals to each one of the number of motors in a very short time (in the order of milliseconds). Furthermore, since the motors are placed in a rotating part of the labelling machine, the transmission of electric power and control signals from the controller to the motors is usually carried out via sliding contact rotary commutators.

The huge amount of data to be exchanged by means of the bus and sliding contacts requires that high performing communications buses are used, which besides being expensive, are particularly sensitive to interference and thus not much suitable in this field.

The object of the present invention is thus to provide a labelling machine having command and control means for the drive motors such as to obviate to the drawbacks cited with reference to the prior art.

This and other objects are achieved by a rotary labelling machine comprising:

a carrousel to be pivotally driven by a carrousel motor;

a plurality of container stations supported by said carrousel, in which each container station comprises a container-holding plate and a plate motor suitable to rotate the plate about its own axis, control means suitable to control the movement of the plates as a function of the movement of the carrousel, wherein said control means comprise:

carrousel sensor means suitable to detect the movement of the carrousel and generate a reference signal representative of a movement parameter of the carrousel, such as the direction of rotation and/or the angular position and/or the instantaneous angular speed of the carrousel;

a plurality of local control units, each being connected to one of the plate motors, respectively, and being arranged either in the vicinity of the plate motor or within the housing thereof, and configured to receive and process said reference signal and generate a specific control signal for said motor as a function of the reference signal;

signal propagation means being connected to the carrousel sensor means and to each of the local control units and configured such that, when the labelling machine is working, they receive the reference signal from the carrousel sensor means and propagate said reference signal to each of the local control units.

A dramatic reduction in the amount of transmitted data is obtained, due to the provision of local control units generating the control signal specific for the respective plate motor and due to the transmission of the reference signal (i.e. only one signal/instant) which is the same for all the plate motors. This results in a considerable increase in the transmission speed, with the performance of the signal propagation means remaining unchanged, and allows using a robust communication bus insensitive to interferences. As the specific control signals are calculated locally, and a plurality of local calculation processes are driven by an individual "poor" reference signal that is transmitted within the network and is valid for all the motors, the number of container stations can be increased per each carrousel, in addition to ensuring the signal solidity. An even higher performance can be also achieved in terms of control of the plate movement than so far achievable by means of a mechanical cam control, without however renounce the advantages of electronic controls, such as versatility and adaptability of the system to various types of containers and labels.

In order to better understand the invention and appreciate the advantages thereof, some exemplary non-limiting embodiments of the same will be described herein below, with reference to the annexed drawings, in which.

DETAILED DESCRIPTION OF THE INVENTION

Figure 1:
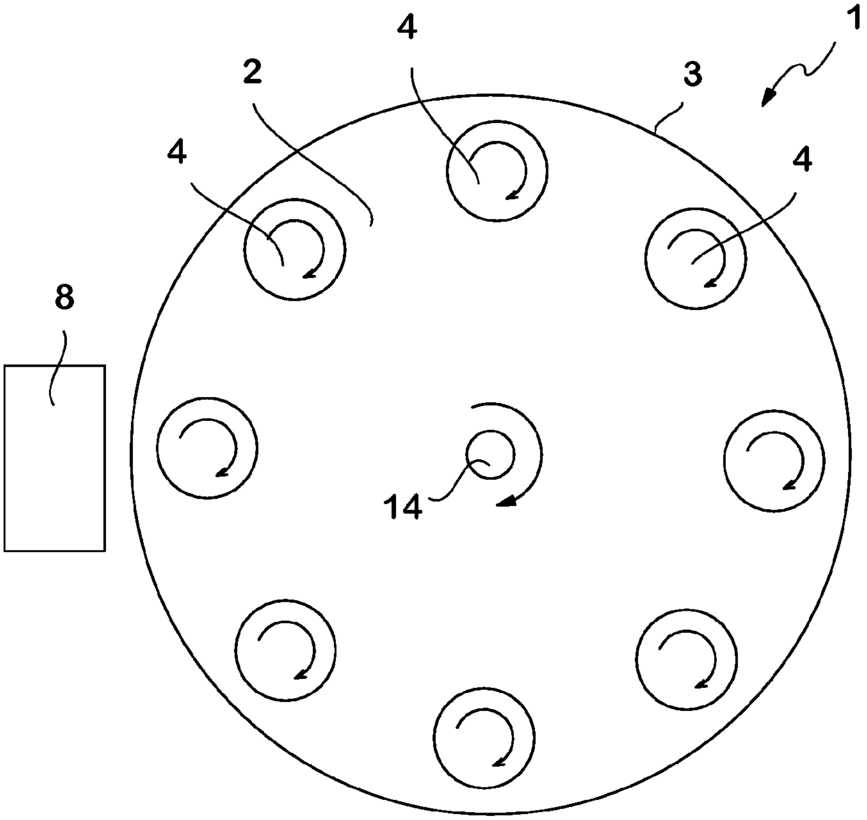
FIG. 1 is a schematic top view of a carrousel rotary labelling machine.

With reference to the figures, a rotary labelling machine is generally designated with 1. The labelling machine 1 comprises a carrousel 2, which supports a plurality of container stations 4 along the periphery 3 thereof, each having a plate 5 which supports the container 6 to be labelled. The carrousel 2 is pivotally driven by a carrousel motor 5 such that each individual plate 5 in the carrousel 2 can be placed at one or more labelling stations 8 that are arranged about the carrousel. To each plate 5, there is associated, i.e. connected—either directly, or by means of a gearing-down mechanism, a plate motor 9 suitable to rotate the plate 5 about its axis to be able to place the container supported thereon in the angular positions required for applying the label.

In order to obtain, by means of the plate motors 9, the desired movement of the plates 5, suitable computerized control means are provided, which are suitable to control the movement of the plate motors 9 as a function of the movement of the carrousel 2. The control means comprise carrousel sensor means, preferably an optical encoder 12 which detects the movement of the carrousel 2 and generates a reference signal representative of a movement parameter of the carrousel, such as the direction and/or angular position and/or angular instantaneous speed of the carrousel 2, preferably its angular instant position.

To each of the plate motors 9, there is connected a local control unit 10 arranged at or within the housing 11 of the motor, and being configured to receive and process said reference signal in order to generate a control signal specific for the motor as a function of the reference signal.

Signal propagation means are provided for the transmission of the reference signal, preferably an electrical communication bus 13 connected with the carrousel sensor means and with each of the local control units 10. The signal propagation means are configured such that, when the labelling machine 1 is operating, they receive the reference signal from the carrousel sensor means and propagate said reference signal to each of the local control units 10.

In accordance with an embodiment, the communication bus 13 is configured such as to transmit the reference signal to the local control units 10 in broadcast mode. This further reduces the signal transmission times, while increasing the stability of the same.

Preferably, though not necessarily, the communication bus 13 is arranged on the carrousel 2, and thus on the same rotating part of the labelling machine which also supports the plate motors 9. Thereby, the distribution of the reference signal from the communication bus 13 to the local control units 10 does not require rotary sliding contact commutators and can be carried out, for example, by means of continuous electric conductors.

The use of a CAN-bus has proved advantageous, in which the Controller Area Network (CAN) connects the local control units 10 and the optical encoder 12 to each other, in an equal manner by means of a two-wire bus. Such a CAN-bus is particularly insensitive to interference and cost-effective. Certainly, the use of a CAN-bus as a signal propagation means in a labelling machine is possible only due to the particular organization of the intelligence and signal transmission as described above.

The carrousel sensor means advantageously comprise an optical encoder 12, or alternatively, a magnetic flux sensor suitable to detect the angular position of the carrousel 2 or carrousel shaft 14, or the angular position of an organ being connected to the carrousel 2 via a gearing-down or gearing-up mechanism of the rotary motion. For example, the optical encoder 12 reads the angular position of the carrousel shaft 14 at a plurality of evenly spaced increments along a full 360° rotation of the carrousel shaft 14, such as 500-800 increments every 360°.

For example, the carrousel sensor means can be integrated within the housing of the carrousel motor 7, such that, when the carrousel or carrousel shaft rotates, its movement is transmitted to the carrousel motor shaft or a sensor gear, the movement of which is detected by the sensor. In response to the movement being detected by the sensor, the latter generates one or more reference electrical signals representative of the above carrousel movement parameter. The reference signals generated can be coded pulses which are transmitted via a signal communication line, such as an electrical conductor, to the communication bus.

Figure 2:
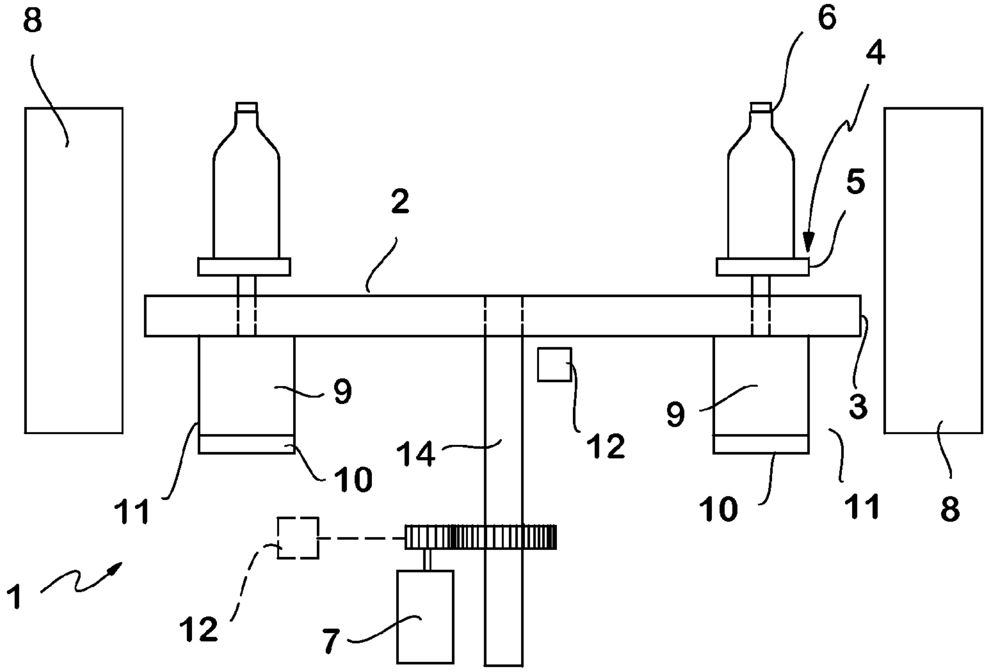
FIG. 2 is a schematic side view of the labelling machine from FIG. 1.
Figure 3:
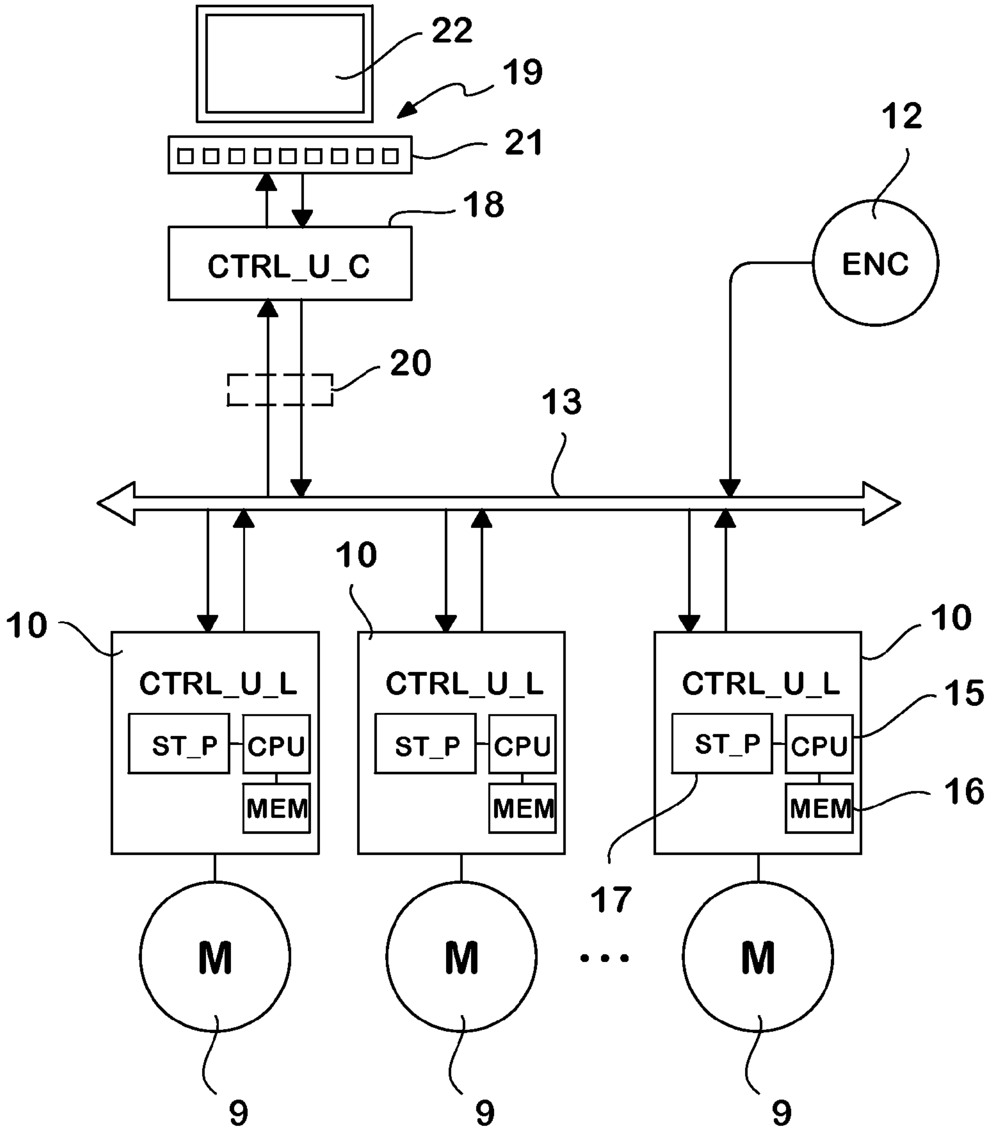
FIG. 3 is a diagram of the control system according to an embodiment of the invention.

In accordance with an embodiment, the carrousel sensor means are arranged on the carrousel, such that they do not require a sliding contact commutator for transmitting the reference signal to the communication bus. Alternatively, the carrousel sensor means are placed outside the carrousel 2 (for example, they are connected by means of a gearing-down mechanism to the carrousel shaft or carrousel motor, such as shown in FIG. 2 in a dotted line) and electrically connected to the signal propagation means via a rotary sliding contact commutator.

Advantageously, each of the local control units 10 comprises a processor 15 and a memory 16 being data-connected with the processor 15. The processor 15 is configured to generate the control signal specific for the plate motor 9 as a function of the reference signal and data and/or specific control programs previously loaded in the memory 16. If required by the type of electric motor being used, the local control unit 10 further comprises a driving stage, for example, a power stage, connected to the processor 15 and suitable to drive the power supply to the plate motor 9 as a function of the specific control signal supplied by the processor 15.

Advantageously, in order to allow a supervision on the labelling machine, the latter further comprises a central control unit 18, such as an industrial computer provided with a processor and a memory, which is connected to the signal propagation means and configured to receive signals indicative of the state and operation conditions from the local control units 10 and/or carrousel sensor means 12 and/or further sensors associated to the labelling machine 1 and connected to the signal propagation means.

The central control unit 18 connected in a network with the local control units 10 are configured such as to allow editing the labelling parameters. Particularly, a user interface 19 is provided and data-connected with and controlled by the central control unit 18. The user interface 19 is configured to receive (commands to edit) the data and/or specific control programs by means of manual input via a keyboard 21 or reading from a memory drive and to transmit the latter to the central control unit 18.

The central control unit 18 and the signal propagation means 13 are configured such as to transmit the (commands for editing the) data and/or specific control programs to the local control unit 10 of the plate motor 9 to which they are addressed, in a selective manner. The processor 15 of the local control unit 10 is suitable to receive and carry out these commands or load these data and/or specific programs to the memory 16 of the local control unit 10.

Preferably, the user interface 19 or a further user interface (not shown in the figures) is configured such as to emit control and supervision signals of the operation of the labelling machine 1, such as via a display 22.

To avoid exposing the central control unit 18 and the user interface 19 being connected thereto to movements which may compromise the operation or use by the user, they are advantageously positioned outside the rotary carrousel 2, and the central control unit 18 is connected to the signal propagation means (bus 13) arranged on the carrousel 2 by means of a rotary sliding contact commutator 20. Alternatively to the sliding contact commutator, a commutator transmitting the signals by means of induction can be also provided.

In accordance with an embodiment, a labelling plant comprises a plurality of above-described labelling machines, in which only one central control unit 18 is provided to be connected to and suitable to carry out the supervision of all the labelling machines, i.e. a plurality of carrousels.

Upon operation of the labelling machine, the optical encoder 12 detects the movement of the carrousel 2 and generates the reference signal (such as a pulse representative of the instantaneous angular position of the carrousel) which is transmitted by the communication bus 13 in broadcast mode to all the local control units 10, each of which carries out the logical and/or arithmetical operations based on the control signal and the data and/or specific programs stored in the local memory 16 in order to generate the control signal specific for the plate motor involved. Thereby, due to the reference signal, the movement of each plate motor 9 is closely linked to the angular position or, more in general, to the movement (i.e. direction, position and angular speed) of the carrousel, but the resolution or fineness of the plate motor movement is not limited by technical restrictions of the signal traffic in the signal propagation means. There results a control of the movement of plates 5, which is particularly accurate, very quick and insensitive to interference.

In fact, the only piece of information exchanged in real time is the reference signal supplied by the optical encoder 12, which acts as a "master timer", and directly transmits this reference signal via its own network interface to the communication bus 13 in broadcast mode, such that this individual signal is read by all the local control units which then carry out the specific control on their own plate motors independently of the other plate motors.

The exchange of information between the local control units and the central control unit is limited to slow information, not in real time, which is sufficient for the central control unit to supervise the labelling process.

Due to the characteristics discussed above, the labelling machine according to the invention implies a reduction in the wiring, simplifies the control logic, gives solidity to the network signal and allows achieving a higher performance in terms of plate movement as compared with known electronic systems and traditional systems with cam profiles.

Finally, in the labelling machine according to the invention, the number of container stations per each carrousel is no longer limited by the performance of the communication bus, but only by the number of nodes allowed by the bus.

We claim:

1. A rotary labelling machine comprising:

a carrousel to be pivotally driven by a carrousel motor;

a plurality of container stations supported by said carrousel, wherein each container station comprises a container-holding plate and a plate motor suitable to rotate the plate about its own axis, control means suitable to control the movement of the plates as a function of the movement of the carrousel, wherein said control means comprise carrousel sensor means suitable to detect the movement of the carrousel and to generate a reference signal representative of a movement parameter of the carrousel;

a plurality of local control units, each being connected with one of the plate motors, respectively, and being arranged in the vicinity of the plate motor or within a housing thereof and configured to receive and process said reference signal and generate a specific local control signal for said motor as a function of the reference signal;

signal propagation means connected between the carrousel sensor means and each of the local control units and configured such that, when the labelling machine is working, the propagation means receive the reference signal from the carrousel sensor means and propagate said same reference signal to each of the local control units, wherein each of the local control units comprises a processor and a memory data-connected with the processor, the processor being configured to generate said specific local control signal as a function of the reference signal and data and/or specific control programs residing in said memory.

2. The labelling machine according to claim 1, wherein said signal propagation means are configured such as to transmit said reference signal to said local control units in broadcast mode.

3. The labelling machine according to claim 2, wherein said signal propagation means comprise an electrical communication bus.

4. The labelling machine according to claim 3, wherein said electrical communication bus is supported by the carrousel.

5. The labelling machine according to claim 1, wherein the carrousel sensor means comprise an optical encoder or a magnetic flux sensor suitable to detect the angular position of the carrousel or the angular position of a device connected to the carrousel by means of a gearing-down or gearing-up mechanism for the rotary motion.

6. The labelling machine according to claim 5, wherein said carrousel sensor means are arranged on the carrousel.

7. The labelling machine according to claim 1, wherein each of the local control units further comprises a driving stage being connected to the processor and suitable to drive power supply to the plate motor as a function of the specific control signal supplied by the processor.

8. The labelling machine according to claim 7, wherein the driving stage comprises a power stage.

9. The labelling machine according to claim 1, wherein the control means comprise a central control unit being connected to the signal propagation means and configured to receive indicative signals of the state and operation conditions from the local control units and/or from the carrousel sensor means and/or from further sensors that are associated with the labelling machine and connected to the signal propagation means.

10. The labelling machine according to claim 9, further comprising a user interface for inputting data editing commands or local control programs to the central control unit, wherein the central control unit and the signal propagation means are configured to transmit the data editing commands and/or specific control programs in a selective manner to the local control unit of the plate motor to which they are addressed, in order to load them into the local memory of said local control unit.

11. The labelling machine according to claim 10, wherein said user interface is configured such as to emit control and supervision signals for the operation of the labelling machine.

12. The labelling machine according to claim 10, wherein said central control unit is arranged outside the rotary carrousel and connected to the signal propagation means by means of a rotary commutator.

13. The labelling machine according to claim 1, wherein said movement parameter of the carrousel comprises the direction of rotation and/or the angular position and/or the angular speed of the carrousel.

14. A rotary labelling machine comprising:

a carrousel to be pivotally driven by a carrousel motor;

a plurality of container stations supported by said carrousel, wherein each container station comprises a container-holding plate and a plate motor suitable to rotate the plate about its own axis, control means suitable to control the movement of the plates as a function of the movement of the carrousel, wherein said control means comprise carrousel sensor means suitable to detect the movement of the carrousel and means for generating a reference signal representative of a movement parameter of the carrousel;

a plurality of local control units, each being connected with one of the plate motors, respectively, and being arranged in the vicinity of the plate motor or within the housing thereof and configured to receive and process said reference signal and generate a specific local control signal for said motor as a function of the reference signal;

signal propagation means connected between the carrousel sensor means and each of the local control units and configured such that, when the labelling machine is working, the propagation means receive the reference signal from the carrousel sensor means and propagate said same reference signal to each of the local control units, said rotary labelling machine further comprising a central control unit connected to the signal propagation means and configured to receive signals indicative of the state and operation condition of the local control unit, as well as a user interface configured such as to emit control and supervision signals for the operation of the labelling machine, wherein each of the local control units comprises a processor and a memory data-connected with the processor, and the processor is configured to generate said specific control signal as a function of the reference signal and data and/or specific control programs residing in said memory.

15. The labelling machine according to claim 14, wherein said signal propagation means are configured such as to transmit said reference signal to said local control units in broadcast mode.

16. The labelling machine according to claim 15, wherein said signal propagation means comprise an electrical communication bus.

17. The labelling machine according to claim 16, wherein said electrical communication bus is supported by the carrousel.

18. The labelling machine according to claim 14, wherein the carrousel sensor means comprise an optical encoder or a magnetic flux sensor suitable to detect the angular position of the carrousel or the angular position of a device connected to the carrousel by means of a gearing-down or gearing-up mechanism for the rotary motion.

19. The labelling machine according to claim 18, wherein said carrousel sensor means are arranged on the carrousel.

20. The labelling machine according to claim 14, wherein each of the local control units further comprises a driving stage being connected to the processor and suitable to supply power to the plate motor as a function of the specific control signal supplied by the processor.

21. The labelling machine according to claim 20, wherein the driving stage comprises a power stage.

* * * * *